United States Patent [19]
Farley et al.

[11] Patent Number: 5,296,654
[45] Date of Patent: Mar. 22, 1994

[54] UNIVERSAL BELT SCALE

[75] Inventors: Paul W. Farley, Minneapolis, Minn.; Chester L. Nachtigal, Seattle, Wash.; Gerald J. Berger, Harold J. Kilts, both of Andover, Minn.

[73] Assignee: CST Autoweigh, Minneapolis, Minn.

[21] Appl. No.: 810,965

[22] Filed: Dec. 20, 1991

[51] Int. Cl.⁵ ............................................ G01G 19/00
[52] U.S. Cl. ...................................... 177/145; 177/16; 177/119; 177/120; 177/121; 177/229
[58] Field of Search .................. 177/145, 229, 16, 119, 177/120, 121

[56] References Cited

U.S. PATENT DOCUMENTS

| | | | |
|---|---|---|---|
| 3,163,248 | 12/1964 | Farquhar | 177/229 |
| 4,260,034 | 4/1981 | Randolph, Jr. | 177/16 X |
| 4,307,787 | 12/1981 | Rabound et al. | 177/229 X |
| 4,682,664 | 7/1987 | Kemp | 177/229 |
| 5,111,896 | 5/1992 | Porcavi et al. | 177/16 |

Primary Examiner—Benjamin R. Fuller
Assistant Examiner—Randy W. Gibson
Attorney, Agent, or Firm—Seed and Berry

[57] ABSTRACT

A universal belt scale for measuring the weight of material being transported on a conveyor belt includes a pair of independent weigh beams, each having a cantilevered deflection section, the beams being uniquely mounted to extend inwardly of the stringers in such a way that the universal belt scale can be used with a variety of belt widths and belt loading situations. The neutral axis of the deflection section is preferably positioned in substantially the same plane as the roll supporting the belt. Alternative embodiments of a mounting allows the position of the weigh beam to be adjusted relative to the idler assembly. Alternative embodiments of an adjustable pivot allow the full scale capacity of the belt scale to be varied. The universal belt scale may also include varying the sensitivity of the weigh beam, for more accurate weighing.

27 Claims, 11 Drawing Sheets

UNIVERSAL BELT SCALE

TECHNICAL FIELD

This invention relates to belt conveyor systems, and more particularly, to weighing mechanisms for belt conveyor systems.

BACKGROUND OF THE INVENTION

The need for accurately measuring the weight of material being transported on a belt conveyor has long been recognized. Knowing the weight of the transported material is particularly important when granulated commodities are involved, such as grain, ore, aggregate, minerals, and coal because certain variables, such as belt speed and the flow rate of the conveyed material, may need to be adjusted for optimal conveying. Weigh feeders are commonly used to regulate the flow of, for example, powdered coal into a coal furnace used at an electric power generating plant.

A primary problem with traditional conveyor scales is their restricted range of application. Conveyors come in a variety of sizes and different load ratings. Materials as diverse as heavy mineral ores, on the one hand, and as light as bags of cotton or tea leaves, on the other hand, may need to be conveyed. Conveyor belts of many widths and load ratings are manufactured for all conceivable situations. This has traditionally required a large number of different conveyor scales.

Attempts have been made to overcome the problems of traditional belt scales by mounting one or more strain sensors on the top surface of the cantilevered portion that supports the idler assembly. The strain sensors measure the stress in the cantilevered portion to measure the weight of material being transported. Such arrangements have also had problems with inaccurate weight measurements because the strain gages lie in a different plane than the carry roll (which supports most of the weight of the material being transported) of the idler assembly. The weight of material being conveyed causes friction when the belt strikes the idler roller and places a horizontal force on the roller. This creates a torque effect or an overturning moment which affects the measurement readings of the strain sensors and thus the accuracy of the weight measurement, since the strain sensors ideally will measure only the stress due to the weight of material on the belt.

Certain prior belt scale mounting arrangements have been designed to avoid interference between the weigh beams and the ends of the idler assembly and the stringers that support the idler assembly. Such mounting arrangements have traditionally involved crossbars. Some of these arrangements have resulted in the strain sensors mounted on the cantilevered weigh beam being placed closer to the level at which the material is being conveyed. Such prior weigh scales have, however, failed to appreciate the importance of carefully adjusting the position of the weigh beam so that the sensors are located at approximately the same horizontal level as the material being weighed.

An additional problem with traditional belt scales is that the conveyor truss or framework experiences shifting, twisting, or movement because of material loading, temperature changes, and vibration from heavy process machinery. Because traditional conveyor scales include a rigid crossbar coupled between the stringers to which a pair of weigh beams are connected, movement of the conveyor frame by the above-mentioned forces cause the weigh idlers on the scale to shift and move, which adversely affects the weight signal.

A problem in common with the above-described traditional weighing mechanisms for conveyor belts is that a specific weigh beam or weighing mechanism must be tailored for each belt conveyor system and the particular weight of material to be conveyed. Conveyor belts come in many different widths and thicknesses according to the type of hauling required. Hence, many types of conveyor scales, such as weigh beams, have traditionally have been required to accommodate the various conveying systems. Factors that have traditionally been unique to the specific designs include the cross-sectional size, the strength, and the length of the cantilever portion of the weigh beam. The costs associated with constructing and inventorying these multiple weighing mechanisms are substantial.

SUMMARY OF THE INVENTION

It is an object of the invention, therefore, to provide a universal belt scale that can be used with a variety of conveyor belt loading situations and belt widths.

Another object of the invention is to provide a belt scale that accurately weighs the material being transported by the conveyor belt without being adversely affected by shifting, twisting, or movement of the conveyor frame.

Still another object of the invention is to provide a means for measuring the flow rate of bulk material being transported on conveyor belt.

Yet another object of the invention is to provide a belt scale that can be mounted to the stringers without a cross bar.

Another object of the invention is to provide an accurate means for measuring the weight of material being conveyed such that the speed at which a belt is driven can be regulated.

Another object of the invention is to provide a belt scale that is inexpensive to manufacture.

Another object of the invention is to provide a means for adjusting the belt scale such that it can be used for a wide range of full-scale capacities.

Still another object is to provide a means for adjusting the height of the weigh beam relative to the idler assembly.

Yet another object is to provide a means for varying the sensitivity of the weigh beam.

The foregoing objects, as well as other objects that will be appreciated from the description below, are achieved by a universal belt scale comprising a pair of a unique mounting brackets, each having a cantilevered deflection beam mounted so as to extend inwardly from the inside of the stringers such that the scale can be used with a variety of belt loadings and belt widths. The neutral axis of the deflection section is preferably positioned in substantially the same plane as the material being transported by the belt to accurately weigh the material and reduce adverse affects of overturning moments caused by the material on the belt. The mounting bracket includes a means for adjusting the location of the weigh beam relative to the idler assembly. An alternative embodiment of the universal belt scale includes a vertical deflection section that is adjustable to vary the stiffness of the deflection section. Another alternative embodiment of the universal belt scale includes an automatic, self-adjusting pivot that allows the belt scale to achieve various fullscale capacities, depending on the material being conveyed. The universal belt scale may also include a means for varying the sensitivity of the weigh beam, for more accurate weighing.

DETAILED DESCRIPTION OF THE INVENTION

Figure 1:
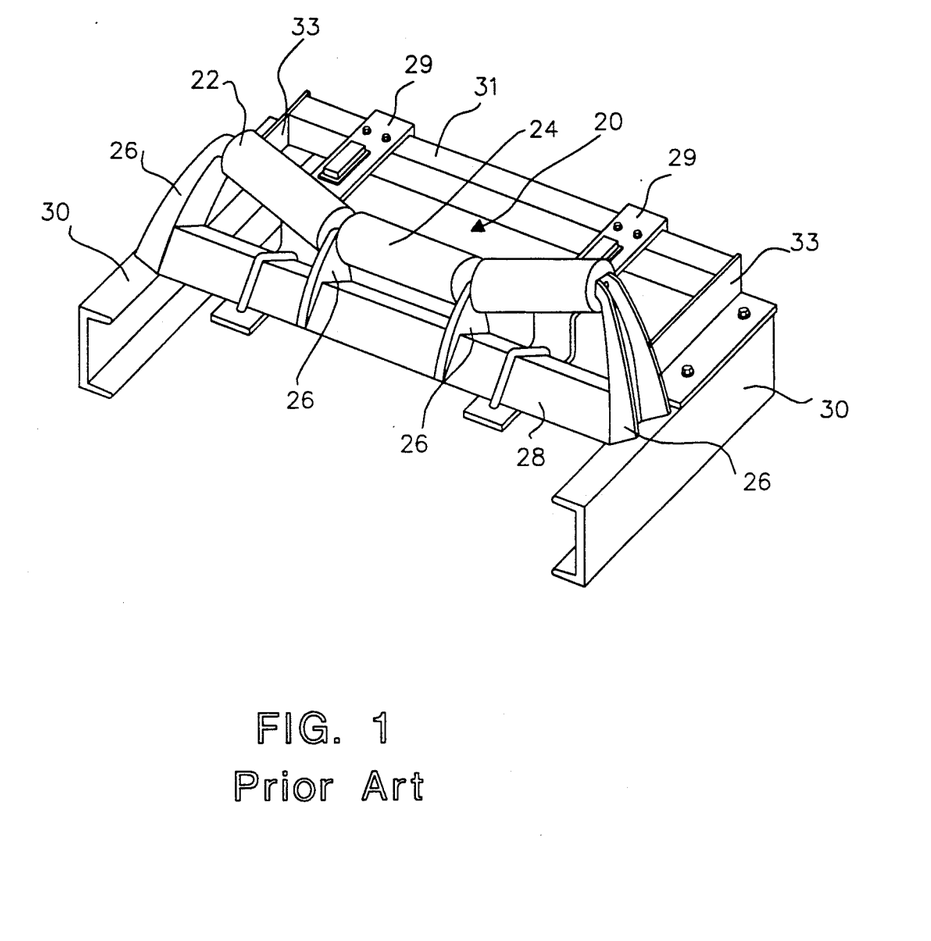
FIG. 1 is an isometric view of a typical idler assembly for a belt conveyor system mounted on top of a prior art belt scale.

To provide a perspective to the present invention, FIG. 1 is included to show a prior art belt scale used to determine the weight of material being transported on a conveyor belt (not shown). A belt travels on top of an idler assembly 20 which comprises a pair of inclined troughing rollers 22 and a horizontal carry roller 24. Each of the idler rollers 22, 24 is mounted by means of a plurality of upstanding support arms 26 to one of the cross members 28. An idler backbone 28 supports the idler assembly 20 and is supported, in turn, by a pair of weigh beams 29. A crossbar 31 is coupled between the stringers 30 by means of mounting brackets 33. The crossbar 31 provides the structure for supporting the weigh beams 29 and secures both weigh beams 29 together such that the belt scale is, in essence, a unitary structure member mounted to the top surface of the stringers 30.

As previously mentioned, one problem with respect to the belt scale shown in FIG. 1 is that it can be used with only one width of belt and size of idler assembly. This is primarily due to the fixed length of the crossbar 31, which must span the lateral spacing of the conveyor stringers 30. Thus, there is a need to manufacture a specific belt scale for each idler assembly width and belt width (since the width of the belt determines the spacing of the stringers). If, for example, ten different belt widths come in ten different load ratings each, this will require one-hundred different conveyor scales. As a result, almost every new requirement for a specific conveyor scale is unique and demands a custom design making such devices expensive to fabricate.

Further, the horizontal plane in which the weigh beam 29 lies differs from the upper portion of the carry roller 24 (which corresponds to the level of material being transported). Therefore, problems with respect to the above-described torque effect and overturning moment are created which render inaccurate the weight measurements calculated with information from the sensors mounted to the weigh frame.

Figure 2:
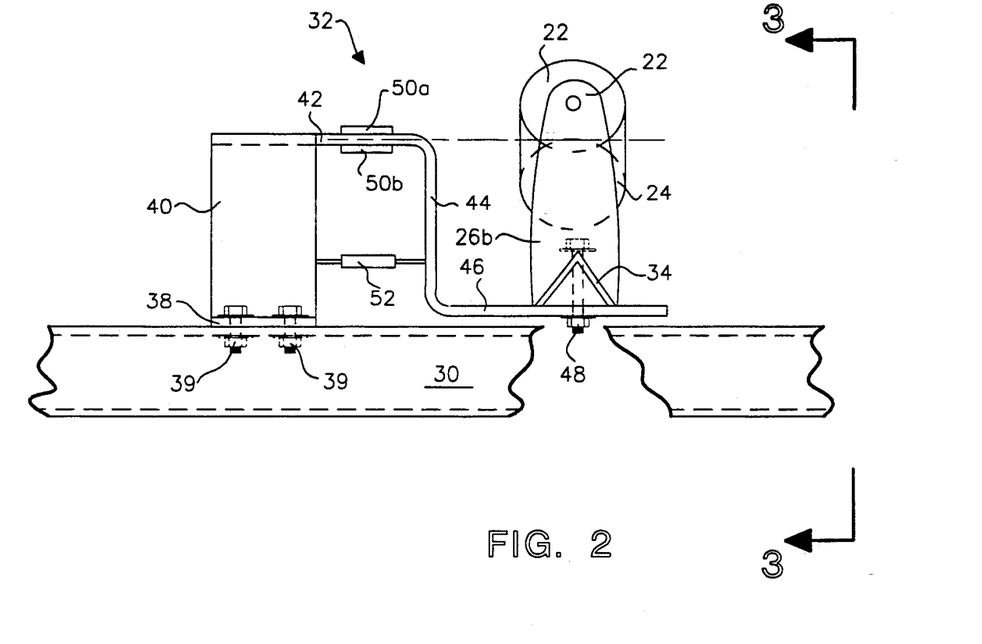
FIG. 2 is a partial side elevational view of an idle assembly mounted on one embodiment of the universal belt scale of the present invention.
Figure 3:
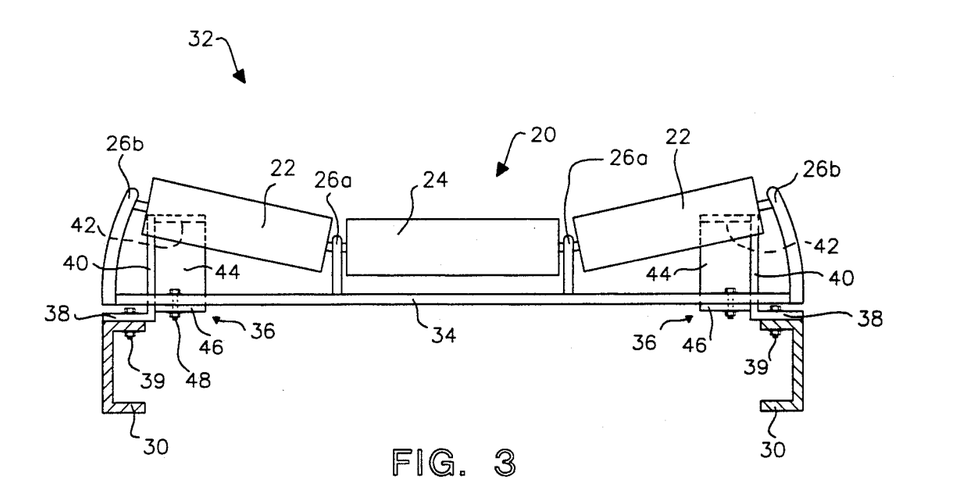
FIG. 3 is a front elevational view, partly in section, taken along the line 3—3 of FIG. 2, of the universal belt scale.
Figure 4:
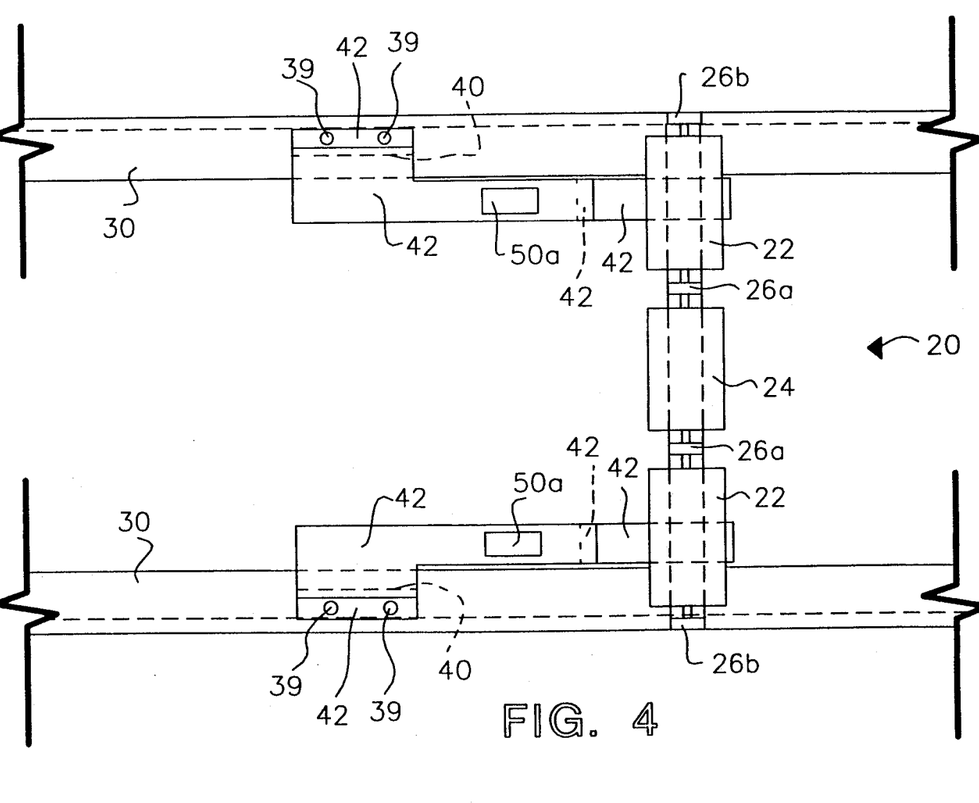
FIG. 4 is a top plan view of the universal belt scale of FIG. 2.

The present invention relates generally, as shown in FIGS. 2-4, to a universal belt scale for use with a typical conveyor belt system. The universal belt scale 32 is connected between an idler assembly 20 having a pair of traditional inclined troughing rollers 22 and a horizontal carry roller 24 rotatably mounted to inner support brackets 26a and end support brackets 26b. The brackets 26 are mounted to the top of a base member 34 which provides transverse stability to the idler assembly 20. The idler assembly supports a conveyor belt (not shown) used to transport material, particularly granulated commodities. It is often critical that the weight of material being carried by the conveyor belt be measured at a specific point along the conveyor belt. By accurately measuring the weight of material being conveyed by the belt, the belt speed can be regulated to control the flow rate of conveyed materials. The belt speed, the angle of idler troughing rolls, the size of the idler rollers, the weight of the idler frame, the thickness of the belt and other factors must be considered in achieving a particular flow rate.

In one embodiment, the idler assembly 20 is coupled to the stringers 30 by means of a mounting member 36. A mounting member comprises a stringer mounting surface 38, an upward extension section 40, a cantilevered deflection section 42, a riser section 44 and an idler assembly support section 46. The mounting member 36 is a unitary piece with each of the above-described sections extending one from another. The base member 34 of the idler assembly 20 is secured to the idler assembly support section 46 by means of connection bolts 48.

In one embodiment of the universal belt scale 32 a pair of strain sensors 50a, 50b are secured to the cantilevered deflection section 42. The strain sensor 50a senses tensile stress in the cantilevered deflection section 42 when the belt scale is loaded. The strain sensor 50b senses compressive stress in the cantilevered deflection section 42 when the belt scale is loaded. The strain sensors 50a and 50b are connected to a measurement circuit differentially to provide a highly accurate means of measuring the deflection of the cantilevered deflection section 42 from which the weight of the material being conveyed can be calculated.

The mounting arrangement shown in FIGS. 2–4 also provides the advantage that the neutral axis of the cantilevered section 42 corresponds to the upper portion of the carry roller 24 (shown in phantom). Horizontal forces exerted on the carry roller 24 thus impart a force on the cantilevered deflection section 42 that acts along the neutral bending plane of the section 42. As a result, the strain sensors 50a and 50b are both loaded equally and in the same direction. Since the sensors 50a,b are connected differentially in a measurement circuit, the measurement circuit does not respond to the horizontal forces. Thus, the weight of the material being transported, resting primarily on the surface of the carry roller 24, can be accurately determined by the deflection in the cantilevered section 42.

Although FIG. 2 shows the top of carry roll 24 positioned to correspond with the neutral axis of the cantilevered deflection section 42, it should be understood that it is the upper portion of the roll 24, from the longitudinal axis of the roll 24 to the top of the roll 24, that must be positioned to correspond to the neutral axis of the cantilevered deflection section 42. This is because there is some degree of friction within the support shaft and not all weight is supported by the axis of the roll 24. Thus, FIG. 2 is intended to show but one possible alignment situation.

FIG. 2 also shows an alternative mounting arrangement of a strain or displacement sensor 52 which is mounted in-between the upward extension section 40 and the riser section 44. Upon deflection of the beam, the displacement sensor 52 is compressed and can thus measure the deflection in the cantilevered section 42 in order to calculate the weight of material being transported by the belt. As with the sensors 50a,b, the sensor 52 does not respond to frictional forces exerted on the carry roller 24 because such forces, being aligned with the deflection section 42, do not cause the section 42 to bend.

It should also be mentioned that a single strain sensor 50a mounted to the top surface of the cantilevered deflection section 42 could alternatively be used to provide a means for calculating the weight of material being transported by the belt. However, the scale would then be sensitive to horizontal forces exerted on the carry roller 24.

A primary advantage of the belt scale shown in FIGS. 2–4 is that no crossbar 28 (FIG. 1) is required for supporting the idler assembly 20. Rather, the sole means for securing the idler assembly 20 to the stringers 30 is by means of the mounting member 36.

Figure 5:
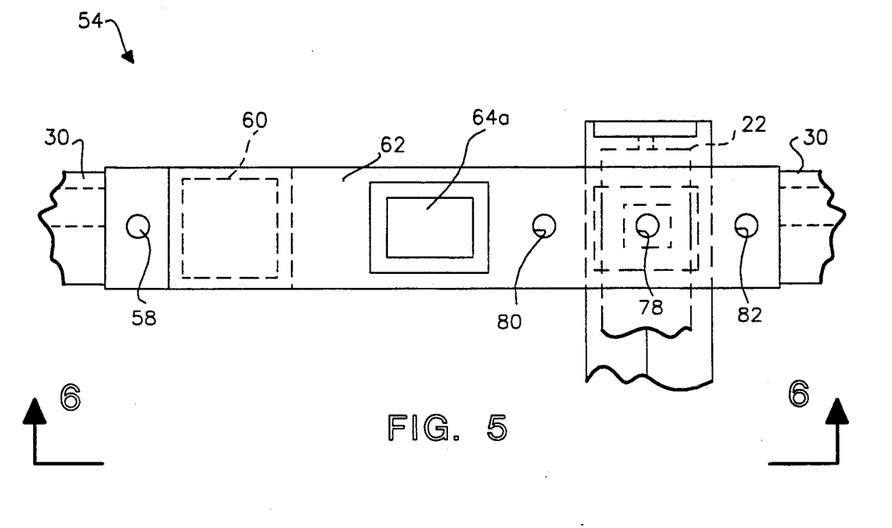
FIG. 5 is a top plan view of an alternative embodiment of the universal belt scale.
Figure 6:
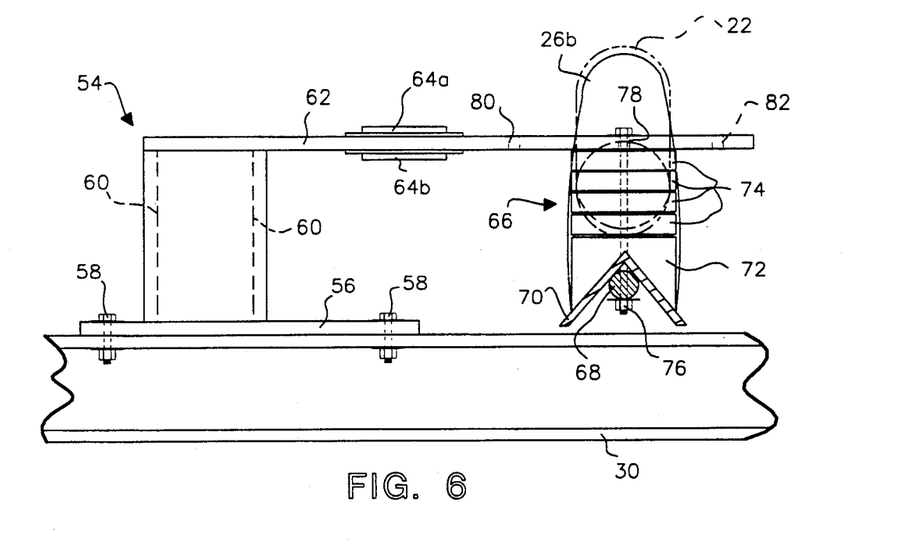
FIG. 6 is partial side elevational view, taken along the line 6—6 of FIG. 5, of the alternative embodiment of the universal belt scale.

FIGS. 5 and 6 show an alternative embodiment of a universal belt scale 53. With reference to FIG. 6, an alternative embodiment of a mounting bracket 54 is shown having the lower foot portion 56 secured to the stringer 30 via connection bolts 58. A generally square tubular structure 60 extends upwardly of the foot section 56 and provides a mounting support for a cantilevered deflection beam 62. A pair of strain sensors 64a, 64b are secured to the top and bottom sides of the cantilevered beam 62 to measure the tensile and compressive stress, respectively, in the cantilever beam 62.

The idler assembly 20 (shown in phantom) is coupled to the cantilevered beam 62 by means of a stack assembly 66. The stack assembly 66 comprises an O-block 68 that extends on the underside of an angle iron base member 70. A V-block 72 rests on the top side of the base member 70, followed by a plurality of shims 74. The stack assembly 66 is secured together by means of a connecting bolt 76 which passes through an aperture 78 in the cantilevered deflection beam 62 and each of the shims 74, V-block, base member 70, and O-block 68. A primary advantage of the stack assembly 66 is that the mounting member 54 can be used with all dimensions of angle-iron idler assemblies. The number of shims 74 needed will depend upon the particular idler assembly to which the mounting member 54 is being mounted. Preferably, the top of the carry idler roller will correspond with the neutral axis of the deflecting beam 52 to provide accurate deflection measurements.

The universality of the belt scale 53 is further enhanced by providing a plurality of apertures 78, 80, 82 through which the stack assembly 66 can be mounted. Even when no material is being transported on the belt, the deflection of the cantilevered deflection beam 62 can vary depending on the size and type of idler assembly being supported. Too much deflection of the beam 62 due to the combined weight of the conveyed material resting on the belt plus the weight of the idler assembly will adversely affect the strain gage measurements and produce inaccurate weight measurements by overloading the strain capability of the sensors. Thus, heavier loaded idler assemblies will need to be mounted closer to the support member 60b to reduce the length of the cantilever that supports the idler assembly and thus minimize deflection of the beam 62 prior to loading the belt while conveying and weighing material carried by the belt.

Thus, a plurality of apertures 78, 80, 82 are provided so the universal belt scale 53 can be adapted to accommodate most idler assemblies and belt loading requirements. Another way to compensate for preload deflection of the beam 62 would be to move the position of the strain sensors 64a, 64b relative to the stack assembly 66. In order to minimize deflection of the idler assembly while conveying material, the optimum arrangement is to move the idler assembly closer to the sensors rather than vice versa. It should be understood that similar apertures could be provided in the support member 46 of the universal belt scale embodiment of FIGS. 2–3 to provide the same universality.

Figure 7:
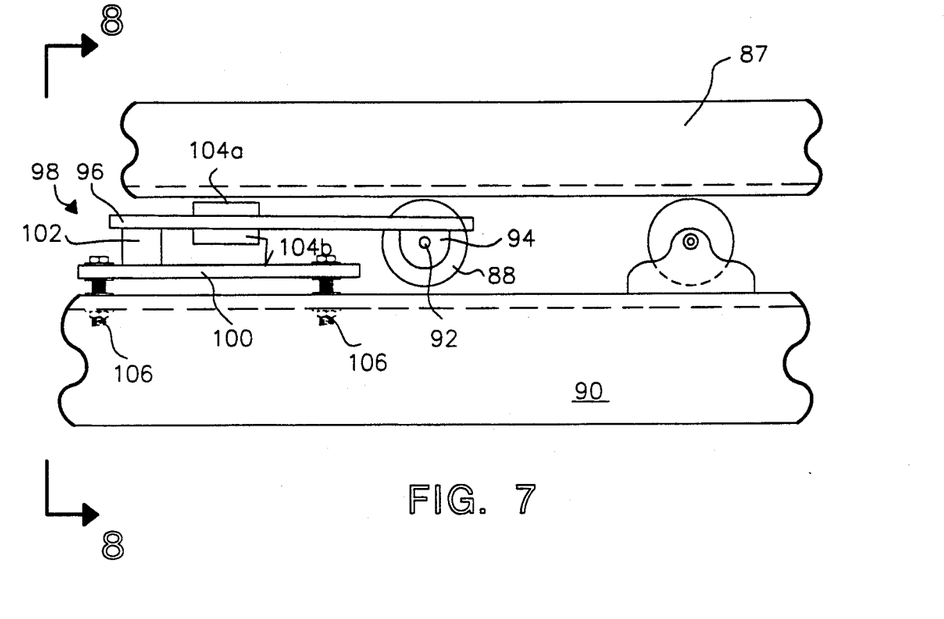
FIG. 7 is a partial side elevational view of the universal belt scale used with a weigh feeder.
Figure 8:
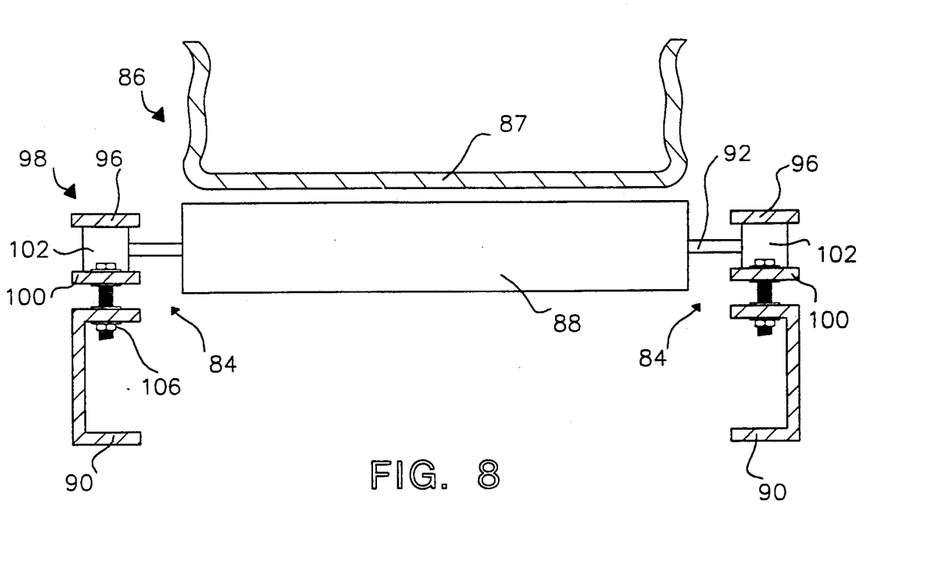
FIG. 8 is a front elevational view, partly in section, taken along the line 8—8 of FIG. 7, of the universal belt scale used with a weigh feeder.

FIGS. 7–8 show an embodiment of the universal belt scale for use with weigh feeder 86 for measuring the weight of material being transported on a conveyor belt 87. Weigh feeders are typically short sections of a conveyor belt system that have a plurality of single, horizontal rollers across which the belt rides so that the contents of the belt can be weighed and so the feed rate can be controlled to a desired rate.

The weight feeder of FIGS. 7–8 comprises an idler roller 88 rotatably mounted on top of a pair of stringers 90. An axle 92 of the roll 88 is mounted at each end to a bracket 94, which in turn is coupled to a cantilevered deflection beam 96. The beam 96 comprises a portion of mounting member 98 which further includes a foot member 100 and a vertical support member 102. Strain sensors 104a, 104b are mounted to the top and bottom surfaces of the beam 96 to measure deflection and thus the weight of material on the belt. The height of the mounting member 98 can be adjusted by means of adjustment bolts 106.

Figure 9:
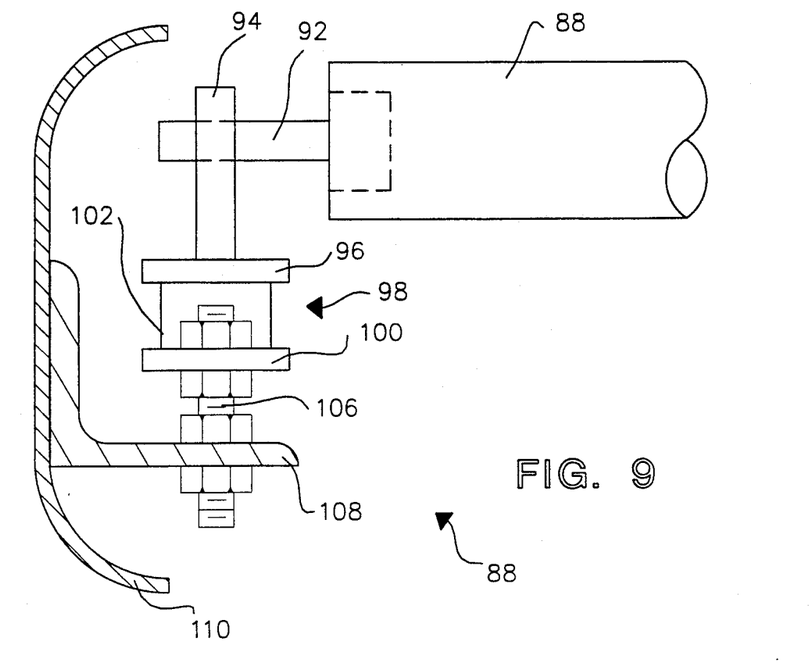
FIG. 9 is a partial front elevational view, partly in section, of an alternative embodiment of the universal belt scale used with a weigh feeder.
Figure 10:
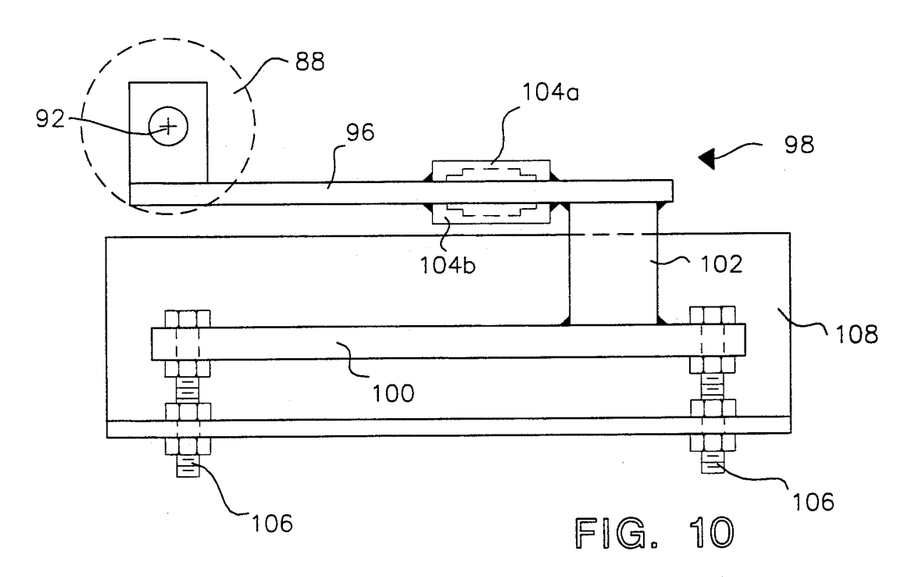
FIG. 10 is a side elevational view of the universal belt scale of FIG. 9.

With reference to FIGS. 9–10, an alternative embodiment of a universal belt scale 84 includes a mounting member 98 coupled to an angle iron bracket 108 attached to the inside of a stringer 110. This mounting arrangement allows the entire belt scale 84 to be mounted inboard of the stringer and thus avoid any of the above-described problems with respect to interference with the stringer.

Figure 11:
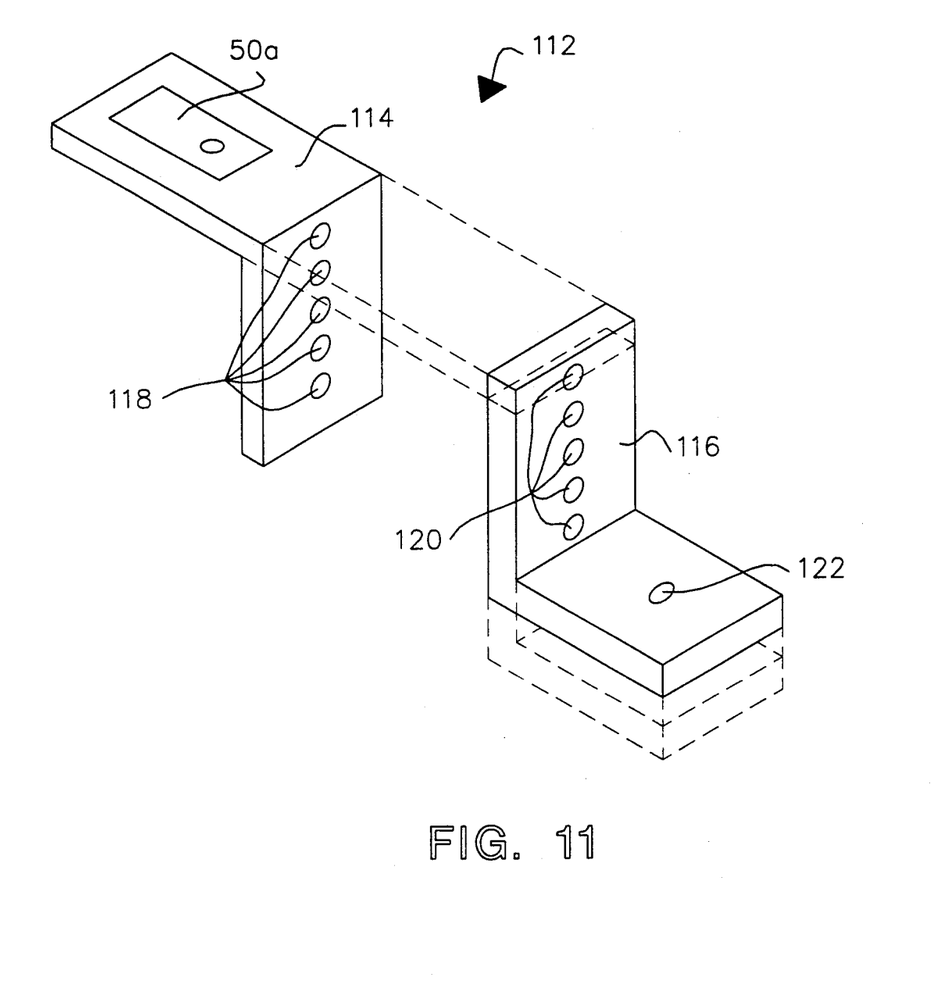
FIG. 11 is an isometric view of an adjustment bracket that can be used, for example, in connection with the embodiment of the universal belt scale of FIGS. 2–3.

FIG. 11 shows an alternative adjustable mounting bracket 112 that can be used, for example, with the universal belt scale 53 shown in FIGS. 2-3. The bracket 112 comprises two sections, an upper riser section 114, and a lower riser section 116. The upper section 114 and the lower section 116 include a plurality of mounting holes 118 and 120, respectively, so that each can be adjusted relative to one another and vary the height at which the idler assembly is mounted to insure that the sensor 50a lies in approximately the same plane as the material being weighed. The lower riser section 114 is secured to the idler assembly (not shown) by means of mounting hole 122 through which bolt 48 is mounted.

Figure 12:
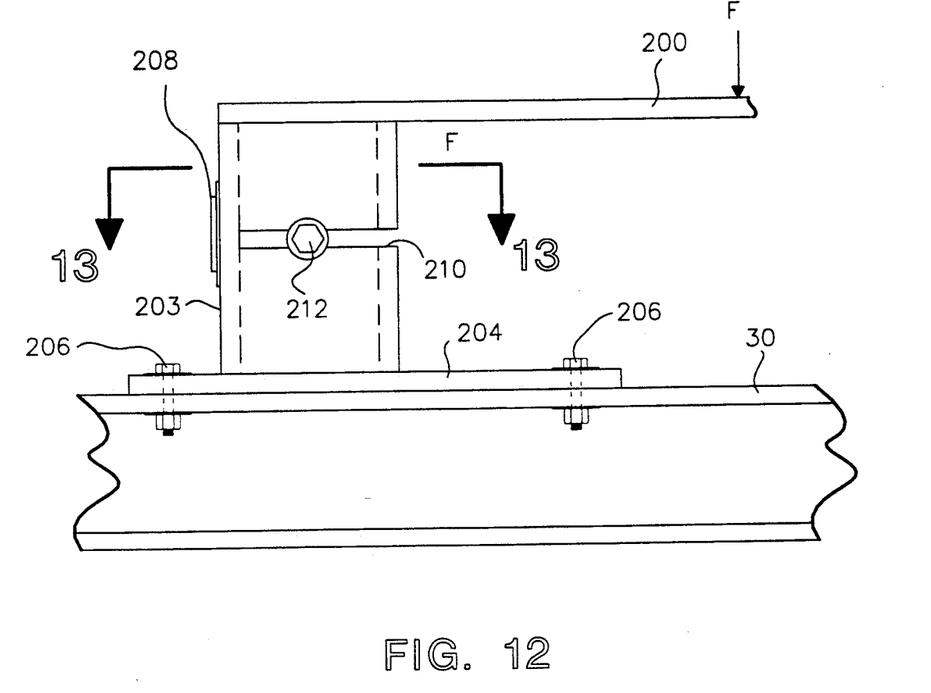
FIG. 12 is a side elevational view of an alternative embodiment of the universal belt scale which includes an adjustable pivot.
Figure 13:
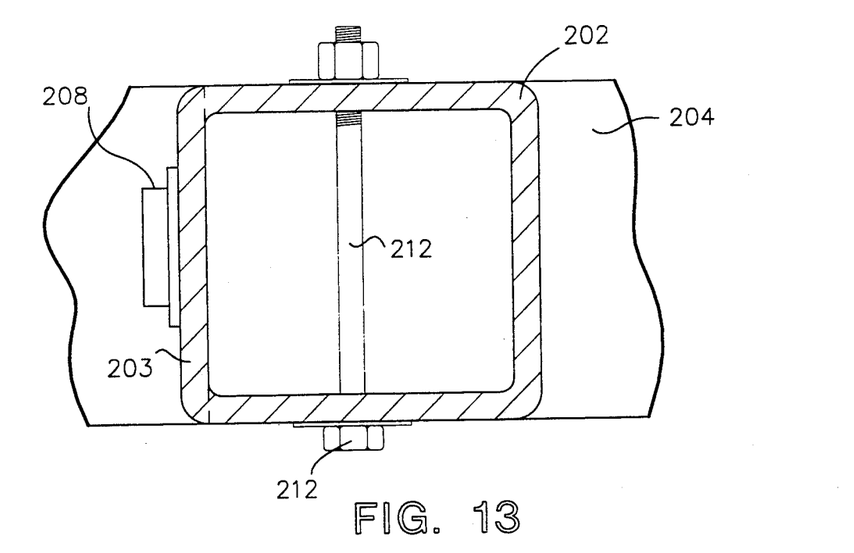
FIG. 13 is a top view, partly in section, taken along the line 13—13 of FIG. 12, of the adjustable pivot.

With reference to FIGS. 12-13, an alternative embodiment of the universal belt scale involves a cantilevered beam 200 (similar to the cantilevered beam 62 of FIGS. 5-6) secured to an upstanding support member 202 coupled to the stringers 30 by means of a base member 204. The base member 204 is secured to the stringer 30 via mounting bolts 206. A strain sensor 208 is secured to a side of the upstanding support member 202 opposite the end of the cantilevered beam 200.

As weight is applied to the overhung cantilever, shown to be a force F in FIG. 12, the opposing or resisting moment results from two factors. The first factor is the tension experienced by the end wall 203 and the strain sensing device, and the second factor is the distance the strain sensor is positioned relative to the pivot point.

The strain sensor 208 is arranged in a generally vertical orientation to measure the strain experienced by the end wall 203 of the upstanding member 202 when the force F acts on the cantilevered beam 200. The upstanding member 202 includes a slot 210 in which a bolt 212 is positioned. The bolt 212 can be secured along the slot at any given position to vary the pivot point, and thus the length of the moment arm, created when the force F is applied to the end of the cantilevered beam 200. By adjusting the position of the bolt 212, the stiffness of the end wall of upstanding member 202 can be controlled. By changing the location of the bolt 202, the full-scale capacity of end wall 203 can be adjusted, depending upon the magnitude of the force F placed on the cantilevered beam 200. For example, if a relatively small magnitude of force F is applied to the cantilevered beam 200, increased sensitivity of the strain sensor 208 can be achieved by moving the bolt 202 closer to the strain sensor 208. Conversely, if a relatively large magnitude of force F is desired to be measured, the bolt 212 can be moved away from strain sensor 208 to increase the full-scale capacity (i.e., to render the strain sensor 208 less sensitive) of the belt scale. The amount of electronic signal can also be adjusted, even in the field, to create a high or low capacity scale, depending upon the desired optimum signal output for a given operating condition.

Figure 14:
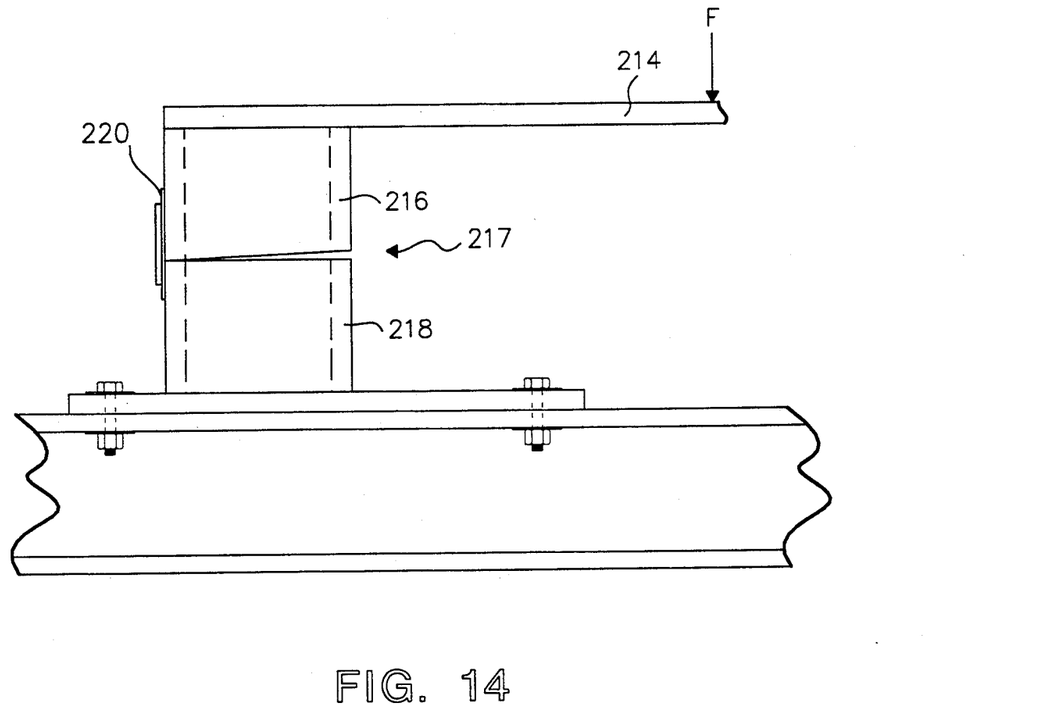
FIG. 14 is a side elevational view of an alternative embodiment of the universal belt scale including an automatic self-adjusting pivot.
Figure 15:
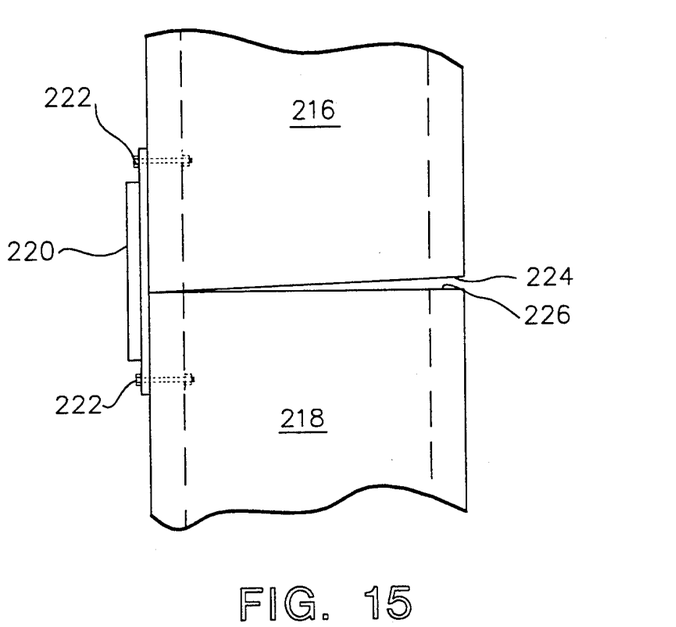
FIG. 15 is a magnified partial side elevational view of the self-adjusting pivot of FIG. 14.

Referring now to FIGS. 14-15, an alternative embodiment of the universal belt scale involves a cantilevered beam 214, arranged in a manner similar to what is shown in FIGS. 5-6, coupled to an upper half 216 of an upstanding portion 217, which is in turn supported by a lower half 218 of upstanding support member 217. The upper portion 216 is secured to the lower portion 218 solely by means of a strain sensor 220 which is secured to each portion 216, 218 by means of connecting bolts 222. The upper portion 216 includes a curved, precision-ground surface 224 which at one end rests on top of a flat surface 226 of lower portion 218. An enlarged view of the upper portion 216 coupled to the lower portion 218 is shown in FIG. 15. Such a mounting arrangement creates an auto-adjusting sensitivity means which allows the curved surface 224 of upper portion 216 to rock down against the flat surface 226 of lower portion 218 when an increased force F is applied to the cantilevered beam 214, thus changing the pivot point of the moment arm. Such a change is predictable and the movement of the pivot point is repeatable.

A typical deflection scale operates on the principle that the deflection is linearly proportional to the weight. This is because the modulus of elasticity of typical deflection materials is linear. Conventional deflection elements are comprised of steel or aluminum. Scales are generally calibrated and certified by making the scale read zero when no load is being applied (thus, there is no deflection in the beam) and by adjusting the read-out to display the known accurate weight when a particular weight is applied to the scale. All readings from zero to the known weight are assumed linear up to the capacity of the scale. A more sensitive scale has a more deflection per increment of weight than a large capacity scale. In traditional belt scales, the sensitivity (i.e., the full-scale capacity) is not automatically adjustable. The signal level per increment of weight is the same from the zero reading up to a full-scale situation. Thus the universal belt scale has the advantage of being capable of changing its full scale capacity.

With reference to the auto-adjusting sensitivity invention as shown in FIGS. 14 and 15, the ratio of electronic signal will change depending on the force F that is applied to the cantilevered beam 214. The more force F applied to the cantilevered beam 214, the more the curved surface 224 rocks down onto the flat surface 226 to change the pivot point. The curved surface 224 has a curvature that is highly precise such that the rate of pivot movement remains constant with an increased magnitude of force F being applied to the cantilevered beam 214. In such an arrangement, a flexible boot (not shown) may be used to cover the stain sensor and the area in-between curved surface 224 and flat surface 226.

Figure 16:
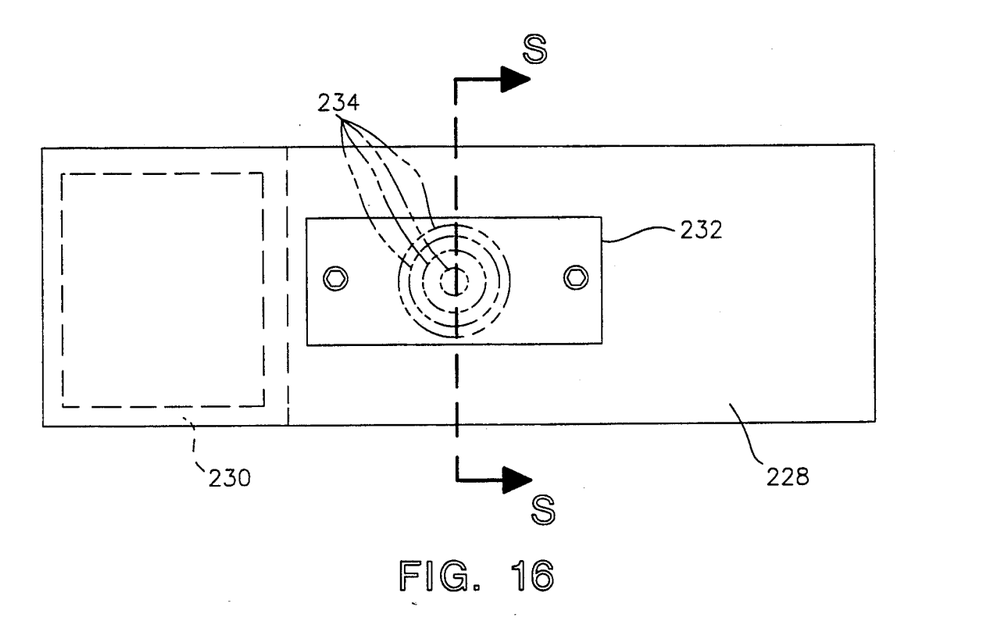
FIG. 16 is a top plan view of a weigh beam for the universal scale showing multiple stress concentrating holes.

With reference to FIG. 16, a means for varying the sensitivity of a cantilevered beam 228 is shown. An upstanding member 230 supports at one end the cantilevered beam 228. A strain sensor 232 is secured to the top surface of the cantilevered beam 228 for measuring the strain in the beam. Depending upon the sensitivity desired in the beam, one of a plurality of different diameter holes 234 can be drilled completely through the cantilevered beam 228 to reduce the cross-sectional material of the cantilevered beam 228 at the point where the strain is being measured (shown as line S-S in FIG. 16). The greater the sensitivity desired, the larger diameter of hole 234 should be drilled into the cantilevered beam. Such a reduction in the cross-sectional area of the weigh beam 228 concentrates the stress to be measured by the strain sensor 232 and increases the sensitivity of the strain sensor. Such an arrangement will produce, naturally, more accurate strain measurements. This stress-concentrating method can be used in connection with any of the aforementioned deflection beams to achieve a degree of sensitivity according to the weight of material being measured.

Figure 17:
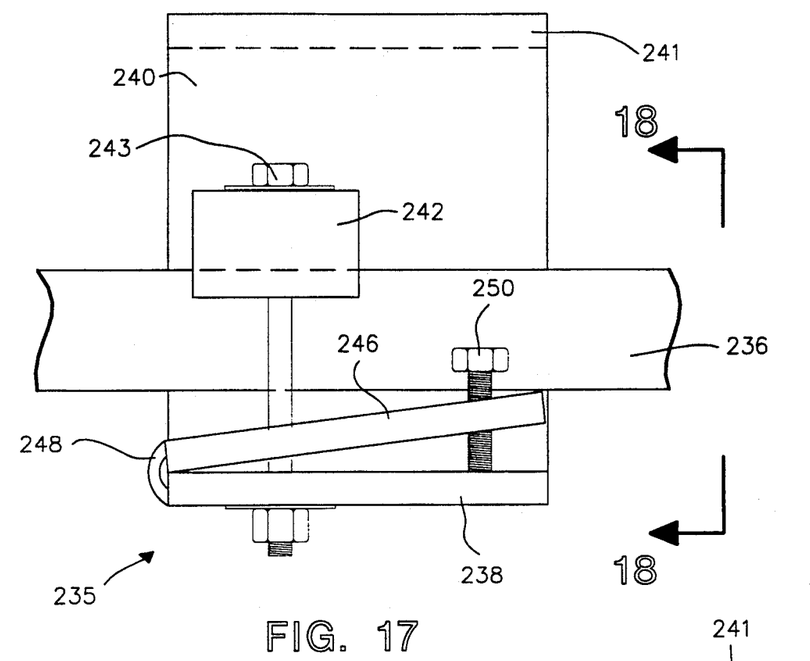
FIG. 17 is a front view of a hinged plate adjustment bracket for the universal belt scale.
Figure 18:
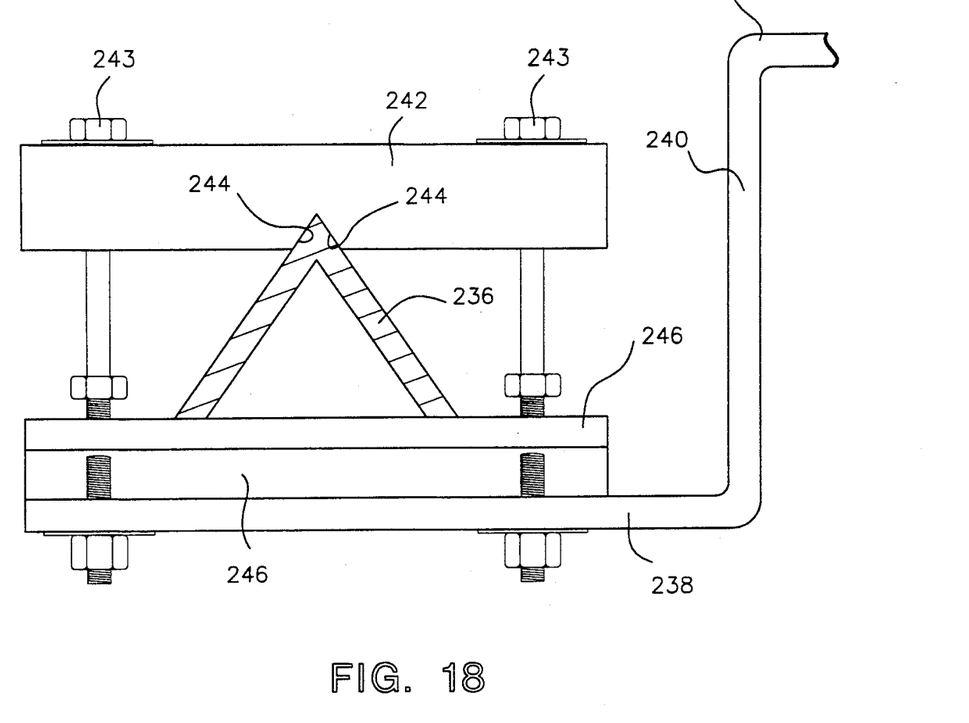
FIG. 18 is a side view, taken along the line 18—18 of FIG. 17, of the hinged plate adjustment bracket for the universal belt scale.

FIGS. 17–18 show an alternative embodiment for adjusting the height of the cantilevered beam (not shown) relative to the height of the idler assembly. A hinged plate adjustment bracket 235 is mounted to an idler backbone 236 which supports an idler assembly (not shown). Idler backbone 236 supports an idler assembly similar to the idler backbone 34 as shown in FIGS. 2–4. The idler backbone 236 (and the idler assembly not shown) is secured to a lower support portion of a cantilevered beam which is coupled, in turn, to a vertical extension 240 of the deflection beam. The idler backbone 236 is compressed between an upper block 242 having a V-shaped notch 244 on the one side and a hinged plate 246 secured to lower support member 238 via hinge 248. Bolts 243 are tightened to hold the mounting arrangement firmly in place. Since the lower support portion 238, the vertical extension section 240, and the cantilevered portion 241 are fixed in terms of position, the vertical orientation of the idler backbone 236 (thus the idler assembly) can be adjusted relative to the cantilevered portion 241 by rotating an adjustment screw 250 which will cause the hinged plate 246 to move further away from lower support portion 238 (thus raising the idler assembly relative to the cantilevered beam portion 241) or cause the hinged plate 246 to move toward the lower support portion 238 (thus lowering the idler assembly relative to the cantilevered beam portion 241).

Such adjustments of the idler assembly relative to the cantilevered beam are important to align the neutral axis of the cantilevered beam substantially in the same orientation as the position of the carry roller, as discussed above, to avoid inaccuracies caused by the overturning moment.

When the hinged plate adjustment bracket 235 can be used in combination with the independently mounted weigh beams, such as, for example, the beams shown in FIGS. 2–4, the universal belt scale can be installed on the stringers 30, even when the belt is running. With reference to FIGS. 2–4, such installation is achieved by first securing the stringer mounting surface 38 to the top of the stringers 30, then by securing the lower support portion 238 (FIGS. 17–18) of the weigh beam to the existing idler backbone 236 using the hinged plate adjustment bracket 235, removing any preexisting mounting means between the idler assembly and the stringers, and subsequently turning the adjustment screws 250 to raise the idler backbone relative to the weigh beam and stringers to provide clearance with respect to the stringers and to position a roll of the idler assembly in substantially the same plane as the neutral axis of the weigh beam. Unlike traditional belt scales, all of the above steps can be performed on an existing conveyer belt system while the belt is running.

From the foregoing, it will be appreciated that, although specific embodiments of the invention have been described herein for purposes of illustration, various modifications may be made without deviating from the spirit and scope of the invention. Accordingly, the invention is not to be limited except as by the appended claims.

We claim:

1. A universal belt scale for weighing material being transported on a conveyor belt, comprising:
   a pair of opposite stringers extending parallel to one another;
   a pair of cantilevered beams, each having a neutral axis and being mounted at a first end to one of said stringers and supporting at a support location spaced from the first end an idler assembly, said idler assembly including a carry roller rotatably supporting a conveyor belt;
   sensing means coupled to cantilevered beams for measuring the deflection of the cantilevered beams responsive to a weight of material being conveyed by the belt;
   said cantilevered beams being mounted to the stringers independently of one another to isolate each said cantilevered beam from each other; and
   said neutral axis of said cantilevered beams lying in a first plane, the idler assembly being mounted to the beams to position a top of the carry roller in said first plane so that the sensing means accurately senses the weight of material on the belt without being appreciably affected by external factors unrelated to the weight of the material on the belt.

2. The universal belt scale according to claim 1 wherein the sensing means comprises a pair of strain sensors coupled to each side of the cantilevered beams for measuring the deflection of the beams to determine the weight of material being transported by the belt, the position of the carry roller in the neutral axis of the beams allowing the strain sensors to measure the deflection of the beams without being affected by a force normal to the beams caused by friction between the carry roller and the belt.

3. The universal belt scale according to claim 1 wherein an entire weight of the idler assembly is supported by the beams and the beams extend inwardly of the stringers to allow the beams to deflect without interference with the stringers so that accurate measurements of the weight of material being conveyed can be obtained.

4. The universal belt scale according to claim 3 wherein the cantilevered beams are capable of supporting a variety of different idler roller assemblies.

5. The universal belt scale according to claim 1 wherein a mounting member is mounted to an inside surface of each stringer, the cantilevered beams forming an integral part of the mounting members, the mounting members extending toward the inside of the stringers such that deflection of the cantilevered beams will not be impeded by the stringer and the weight of the material on the belt can be accurately measured.

6. The universal belt scale according to claim 5 wherein the mounting members connect the cantilevered beams to the stringers such that an entire weight of the idler assembly is supported by the mounting members.

7. The universal belt scale according to claim 6 wherein each of the mounting members comprises a stringer mounting surface for securing the mounting member to a top surface of the stringer, an upward extension section extending upward from the stringer mounting surface, the cantilevered beam extending horizontally from the upward extension section, a riser section extending downwardly from the cantilevered section, and an idler assembly support section extending perpendicularly from the riser section for securing the idler assembly to mounting member, the mounting members positioning the cantilevered sections inboard of the stringers such that deflection of the cantilevered beam is unimpeded by the stringer and the weight of conveyed material can be determined.

8. The universal belt scale according to claim 7 wherein a first strain sensor is coupled to a top surface of the cantilevered section for measuring tensile stress in the cantilevered beams when the belt transports material, and a second strain sensor is coupled to a bottom surface of the cantilevered section for measuring compressive stress, the first and second strain sensors providing an accurate means for measuring the deflection of the cantilevered section so that the weight of material being transported by the belt can be precisely determined.

9. The universal belt scale according to claim 7 wherein the strain sensor is mounted between the upward extension section and the riser section to measure movement of the riser section relative to the upward extension section and thus the deflection of the cantilevered beams so that the weight of material being transported by the belt can accurately be determined.

10. The universal belt scale according to claim 6 wherein the mounting member includes a means for adjusting the carry roller to correspond to said first plane such that the universal belt scale can be used with roller assemblies of varying sizes.

11. The universal belt scale according to claim 10 wherein the means for adjusting a height of the carry roller comprises an upper riser section and a lower riser section, the upper and lower riser sections having a plurality of spaced apertures such that the position of the lower riser section can be adjusted relative to the upper riser section to position the idler assembly in said first plane so that the deflection of the cantilevered beams can accurately be measured.

12. The universal belt scale according to claim 10, further comprising a stack assembly mounted between the cantilevered beams and the idler assembly, the stack assembly adjustably supporting the idler assembly such that the carry roller of a variety of idler roller assemblies can be positioned to correspond to said first plane to increase the accuracy of the sensing means.

13. The universal belt scale according to claim 1 wherein the carry roller is an only roller on the idler assembly and the idler assembly forms part of a weigh feeder.

14. The universal belt scale according to claim 1 wherein the cantilevered beams are coupled to the stringers by means of a mounting bracket which comprises a foot portion coupled to a top of the stringer and a pair of vertical support members extending upwardly of the foot portion, said cantilevered beams being coupled to a top of the vertical support members at a proximal end and supporting the idler assembly at a distal end, said sensing means comprising a strain sensor coupled to a surface of the cantilevered beams for measuring the deflection of the cantilevered beams.

15. The universal belt scale according to claim 1, further comprising a variable means defined by the cantilevered beams for varying a sensitivity of the cantilevered beams depending on the weight of material to be conveyed by the belt.

16. The universal belt scale according to claim 15 wherein the variable means comprises an aperture defined by each said cantilevered beam, said aperture being located adjacent the sensing means, a diameter of the aperture being adjustable to vary a cross sectional area of the cantilevered beams adjacent a sensing means to vary the resistance to bending of the cantilevered beams.

17. A universal belt scale for weighing material being transported on a conveyor belt, comprising:

a pair of opposite stringers extending parallel to one another;

cantilevered beams coupled to each stringer at a mounting location, said cantilevered beams supporting an idler assembly at respective support locations on the cantilevered beams;

sensing means coupled to the cantilevered beams for sensing deflection of the cantilever beams responsive to weight of material being conveyed by the belt; and means for adjusting a distance between the mounting location and the support location on each of said cantilevered beams to adjust an effective length of the cantilever beams according to a particular size and weight of a particular idler assembly being supported by the beams such that the sensing means are capable of accurately determining the weight of material being transported by the belt.

18. The universal belt scale according to claim 17 wherein effective lengths of the cantilevered beams can be adjusted to accurately weight the material being transported regardless of a specific type of material being transported, a size of the idler assembly being supported by the beams, or rates of speed at which the belt may travel.

19. The universal belt scale according to claim 18, wherein the sensing means comprises a strain sensor mounted to a top side of each cantilevered beam such that when the cantilevered beams deflect as a result of weight on the belt, the strain sensors measure the deflection so that the weight of the material on the belt can be calculated.

20. The universal belt scale according to claim 19 wherein a plurality of strain sensors are coupled to each cantilevered beam at different locations.

21. A universal belt scale for weighing material being transported on a conveyor belt, comprising:

a pair of opposite stringers extending parallel to one another;

a pair of cantilevered beams each having a neutral axis, one of said cantilever beams being coupled to each stringer, said cantilevered beams supporting an idler assembly which includes a carry roller rotatably supporting a conveyor belt, said cantilevered beams supporting said idler assembly so that a top of the carry roller is positioned in a coplanar relationship with respect to a neutral axis of the beams such that a weight of material transported by the belt can be accurately measured;

sensing means coupled to each cantilevered beam for sensing deflection in the beams and determining the weight of material being conveyed by the belt; and said cantilevered beams being mounted to said stringers and extending inwardly thereof to support said idler assembly at locations inboard of the stringers such that the beams can deflect without interference from the stringers to allow said carry roller to be positioned between said stringers, the cantilevered beams being the sole means for supporting the idler assembly such that the weight of material on the belt can be accurately measured by the sensing means without being affected by additional support structures.

22. The belt scale according to claim 21 wherein the top of the carry roller is positioned in a coplanar relationship with respect to a neutral axis of the beams such that the weight of material transported by the belt can be accurately measured.

23. The universal belt scale according to claim 21 wherein the idler assembly is supported without a need of a cross member coupled between the stringers.

24. A method of installing a universal belt scale on an existing idler assembly of an operating belt conveyor system while the belt is moving, comprising the steps of:
   securing a pair of independent weigh beams to opposite stringers, each said weigh beam having a mounting surface at a first end being secured to a top side of one said stringer;
   securing each said independent weigh beams to an existing, operating idler assembly by means of a hinged plate adjustment bracket, each said weigh beam having a lower support portion for securing to the existing idler, said hinged plate adjustment bracket coupling the idler assembly to the support portion;
   removing a preexisting mounting means previously used to secure the idler assembly to said stringers; and
   adjusting the hinged plate adjustment bracket to vary a position of the idler assembly relative to the weigh beam to provide clearance between the idler assembly and the stringers and to position a roll of the idler assembly in substantially the same plane as a neutral axis of the weigh beam.

25. A universal belt scale for weighing material being transported on a conveyor belt, comprising:
   a pair of opposite stringers extending parallel to one another and providing a primary structural support for a belt conveying means;
   a pair of vertically oriented upstanding members coupled independently to each stringer;
   a cantilevered beam extending from each said upstanding member for supporting an idler assembly which includes a carry roller rotatably supporting a conveyor belt, said cantilevered beam creating a moment arm having a length determined by a position on the cantilevered beam where the idler assembly is supported and a pivot point on the upstanding member about which the moment arm rotates, the length of the moment arm defining a full scale capacity of the belt scale;
   sensing means coupled to a side of each said upstanding member for sensing a moment arm force exerted on the cantilevered beam from a weight of material being conveyed by the belt; and
   means for adjusting the pivot point on the upstanding member and thus the moment arm length to vary a full scale capacity of the universal belt scale.

26. The universal belt scale of claim 25 wherein the upstanding member defines a slot in which a bolt is adjustably mounted, a position of the bolt defining the moment arm length and thus the full scale capacity of the universal belt scale.

27. The universal belt scale according to claim 25 wherein the upstanding member comprises an upper section and a lower section, the upper section having a curved surface which rests on top of a flat surface of the lower section, the upper section being secured to the lower section by means of a strain sensing element coupled to a first side where said upper section abuts said lower section, said upper section and said lower section being separated from one another at a second side opposite said first side because of the curved surface of said upper section such that when a force of predictable, increased magnitude is placed on the cantilevered beam, the upper section is urged toward said lower section at said second side to change the location of the pivot point, and thus the length of the moment arm, to vary the full scale capacity of the universal belt scale.

* * * * *